United States Patent
Sheik et al.

(10) Patent No.: US 12,376,191 B2
(45) Date of Patent: Jul. 29, 2025

(54) HANDLING UNORDERED SIGNALING RADIO BEARER (SRB) PACKETS

(71) Applicant: QUALCOMM Incorporated, San Diego, CA (US)

(72) Inventors: Ansah Ahmed Sheik, Hyderabad (IN); Mohammad Ashraf, Cuttack (IN)

(73) Assignee: QUALCOMM Incorporated, San Diego, CA (US)

( * ) Notice: Subject to any disclaimer, the term of this patent is extended or adjusted under 35 U.S.C. 154(b) by 242 days.

(21) Appl. No.: 17/095,490

(22) Filed: Nov. 11, 2020

(65) Prior Publication Data

US 2022/0151021 A1 May 12, 2022

(51) Int. Cl.
*H04W 80/02* (2009.01)
*H04L 5/00* (2006.01)
*H04W 28/06* (2009.01)
*H04W 76/15* (2018.01)
*H04W 76/27* (2018.01)

(52) U.S. Cl.
CPC ........... *H04W 80/02* (2013.01); *H04L 5/0055* (2013.01); *H04W 28/06* (2013.01); *H04W 76/15* (2018.02); *H04W 76/27* (2018.02)

(58) Field of Classification Search
CPC ..... H04W 80/02; H04W 28/06; H04W 76/15; H04W 76/27; H04L 5/00
USPC ........................................................ 370/331
See application file for complete search history.

(56) References Cited

U.S. PATENT DOCUMENTS

| | | | |
|---|---|---|---|
| 11,206,572 B2 * | 12/2021 | Baek | H04L 1/1848 |
| 2009/0103478 A1 * | 4/2009 | Sammour | H04L 69/28 |
| | | | 370/328 |
| 2017/0041767 A1 * | 2/2017 | Vajapeyam | H04W 72/04 |
| 2020/0022212 A1 * | 1/2020 | Eda | H04L 1/1832 |

FOREIGN PATENT DOCUMENTS

| | | | | |
|---|---|---|---|---|
| EP | 3616432 B1 * | 11/2020 | | H04L 47/14 |
| WO | WO-2015139557 A1 * | 9/2015 | | H04L 1/1874 |

* cited by examiner

*Primary Examiner* — Intekhaab A Siddiquee
(74) *Attorney, Agent, or Firm* — QUALCOMM INCORPORATED

(57) ABSTRACT

Methods and apparatus to handle unordered signaling radio bearer (SRB) packets are disclosed. In some aspects, the apparatus may be a user equipment (UE) or a base station. The apparatus may receive a signaling radio bearer (SRB) packet, buffer it in a radio link control (RLC)-to-Packet Data Convergence Protocol (PDCP) reordering window, and selectively forward or discard the SRB packet based upon a reordering timer with a first expiration period that is greater than a second expiration period associated with a data radio bearer (DRB) reordering timer, to give the apparatus extra time to receive a missing SRB packet while maintaining a shorter latency for DRB packets. In some aspects, the apparatus may detect an out-of-order (OOO) SRB packet and request retransmission without waiting for a sending communications device to check on receive status.

23 Claims, 10 Drawing Sheets

HANDLING UNORDERED SIGNALING RADIO BEARER (SRB) PACKETS

BACKGROUND OF THE DISCLOSURE

1. Field of the Disclosure

Aspects of the disclosure relate generally to wireless communications and to techniques related to handling signaling radio bearer (SRB) packets.

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service, and a fourth-generation (4G) service (e.g., Long-Term Evolution (LTE), WiMax). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

Aspects of the disclosure are directed to handling unordered NR SRB packets in the event of reordering timer expiry at a communications device (e.g., a user equipment (UE) or a base station (BS)). One approach is to treat SRB messages differently from DRB messages, i.e., by provisioning a different expiration timer for SRB messages—one that has a longer duration than the timer used for DRB messages—in order that the system has a chance to identify missing SRB packets and request retransmission of (or otherwise compensate for) the missing SRB packet or packets before the SRB timer expires. Another approach is to provide a fast NACK for packets that have been received out-of-order (OOO), which can be detected based on the values of the Sequence Numbers assigned to those packets by the transmitting side, to give the network time to provide the missing packet before the reordering timer expires. Yet another approach is to combine the two approaches above.

In accordance with the various aspects disclosed herein, at least one aspect includes a method of operating a communications device. The method includes receiving a first signaling radio bearer (SRB) packet. The method also includes buffering the first SRB packet in a radio link control (RLC)-to-packet data convergence protocol (PDCP) reordering window. The method also includes selectively forwarding or discarding the first SRB packet based upon a reordering timer with a first expiration period that is greater than a second expiration period associated with a data radio bearer (DRB) reordering timer.

In accordance with the various aspects disclosed herein, at least one aspect includes a method of operating a communications device. The method includes receiving a first SRB packet. The method also includes detecting that the first SRB packet is an OOO SRB packet that skips over at least one expected SRB packet. The method also includes triggering, before expiration of a reordering timer associated with a RLC-to-PDCP reordering window for the first SRB packet, transmission of a retransmission request for the at least one expected SRB packet. The method also includes selectively forwarding or discarding the SRB packet based upon the reordering timer.

In accordance with the various aspects disclosed herein, at least one aspect includes a communications device (e.g., a UE or BS). The communications device includes a memory, at least one transceiver, and at least one processor communicatively coupled to the memory and the at least one transceiver. The at least one processor is configured to receive a first SRB packet, buffer the first SRB packet in a RLC-to-PDCP reordering window, and selectively forward or discard the first SRB packet based upon a reordering timer with a first expiration period that is greater than a second expiration period associated with a DRB reordering timer.

Aspects generally include a method, apparatus, system, computer program product, non-transitory computer-readable medium, user equipment, cIoT user equipment, base station, wireless communication device, and/or processing system as substantially described with reference to and as illustrated by the drawings, and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

DETAILED DESCRIPTION

Figure 1:
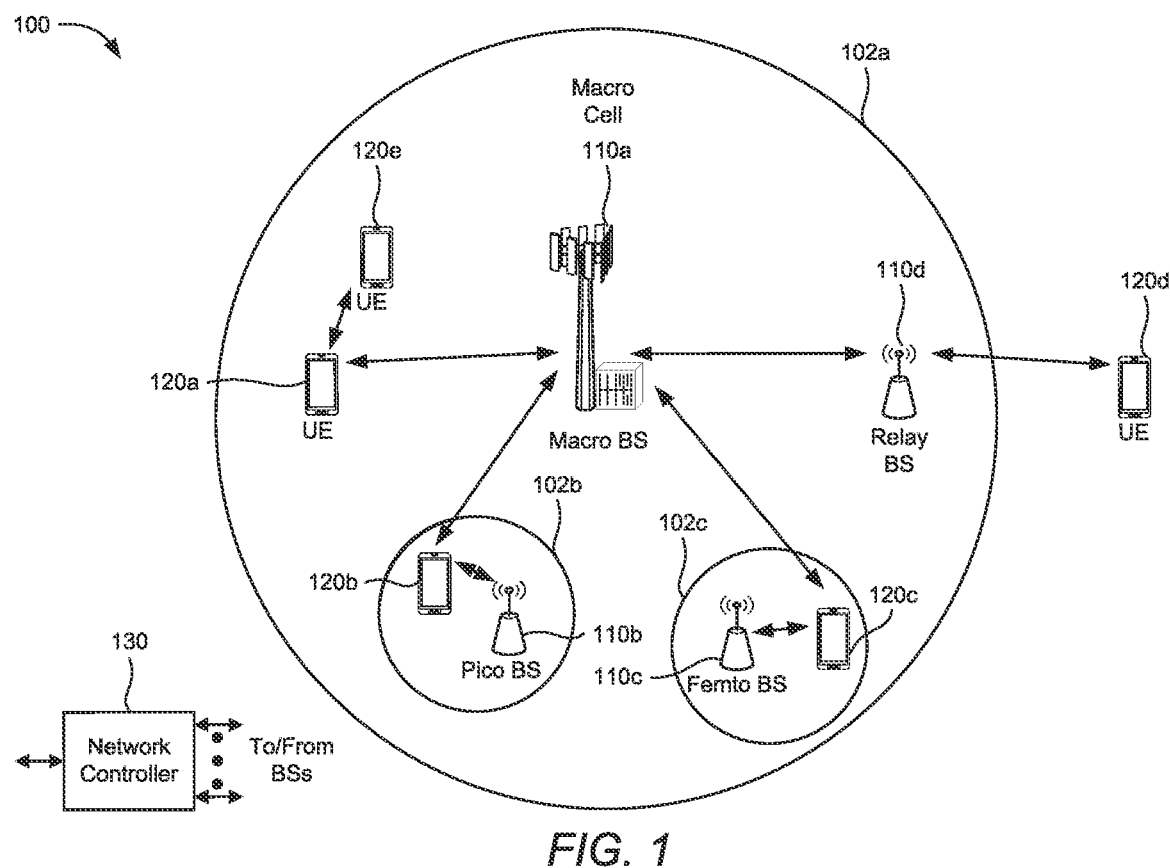
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It should be noted that while aspects may be described herein using terminology commonly associated with 3G and/or 4G wireless technologies, aspects of the present disclosure can be applied in other generation-based communication systems, such as 5G and later, including 5G technologies.

FIG. 1 is a diagram illustrating a wireless network 100 in which aspects of the present disclosure may be practiced. The wireless network 100 may be an LTE network or some other wireless network, such as a 5G network. The wireless network 100 may include at least one base station (BS) 110 (shown as BS 110a, BS 110b, BS 110c, and relay station 110d) and other network entities. A BS is an entity that communicates with user equipment (UEs) and may also be referred to as a base station, a 5G BS, a Node B, a gNB, a 5G NB, an access point, a transmit receive point (TRP), and/or the like. Each BS may provide communication coverage for a particular geographic area. In Third Generation Partnership Project (3GPP), the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "access point (AP)", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. "MTC" may refer to MTC or eMTC. MTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. IoT UEs, eMTC UEs, coverage enhancement (CE) mode UEs, bandwidth-limited (BL) UEs, and other types of UEs that operate using diminished power consumption relative to a baseline UE may be referred to herein as cellular IoT (cIoT) UEs. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Access to the air interface may be controlled, for example, using a unified access control (UAC) system in which UEs are associated with an access identity (e.g., an access class and/or the like), which may aim to ensure that certain high-priority UEs (e.g., emergency response UEs, mission critical UEs, and/or the like) can access the air interface even in congested conditions. Updates to the UAC parameters (e.g., priority levels associated with access identities, which access identities are permitted to access the air interface, and/or the like) may be provided for cIoT UEs using a message, such as a paging message or a direct indication information, which may conserve battery power of cIoT UEs.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples may differ from what is described with regard to FIG. 1.

Figure 2:
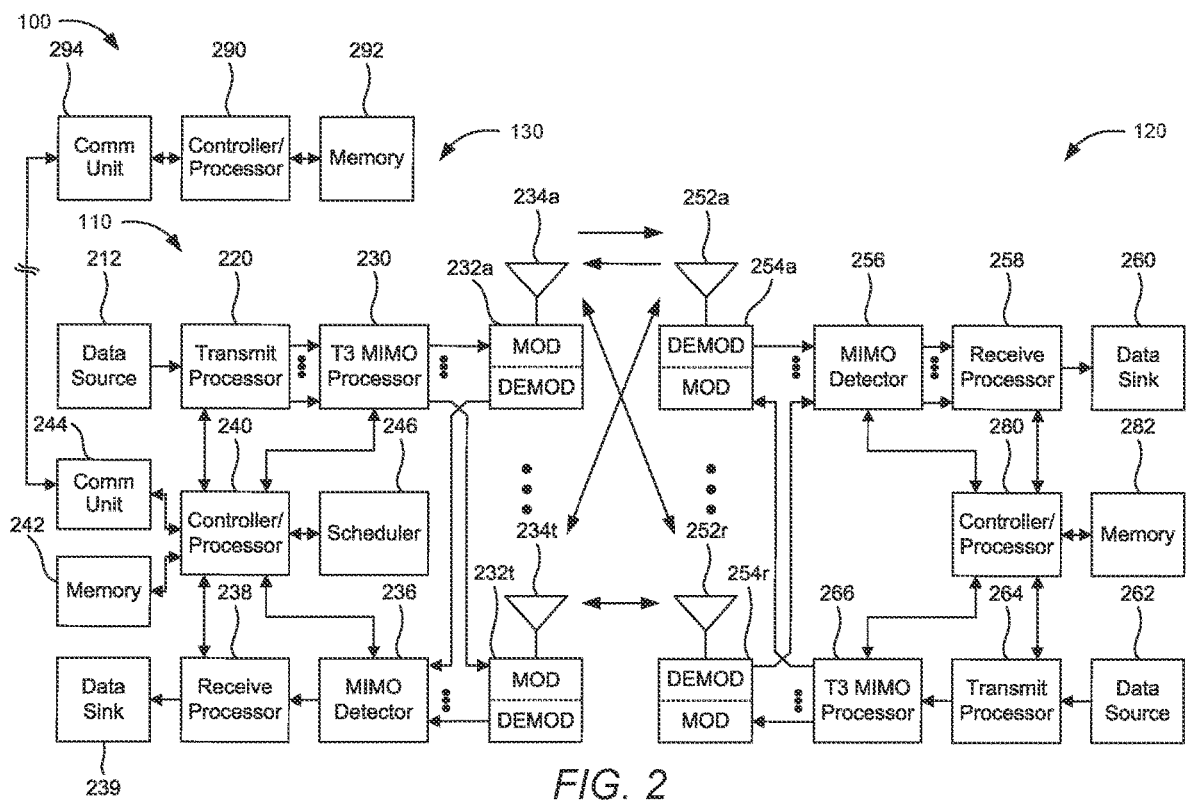
FIG. 2 is a diagram illustrating an example of a base station in communication with a UE in a wireless communication network.

FIG. 2 shows a block diagram 200 of a design of BS 110 and UE 120, which may be one of the base stations and one of the UEs in FIG. 1. BS 110 may be equipped with T antennas 234*a* through 234*t*, and UE 120 may be equipped with R antennas 252*a* through 252*r*, where in general T≥1 and R≥1.

At BS 110, a transmit processor 220 may receive data from a data source 212 for one or more UEs, may select a modulation and coding scheme (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs)/demodulators (DEMODs) 232a through 232t. For brevity, a modulator/demodulator may be referred to simply as a modulator or as a demodulator. Each modulator 232 may process a respective output symbol stream (e.g., for orthogonal frequency divisional multiplexing (OFDM) and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), a reference signal received quality (RSRQ), a channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

Controller/processor 240 of BS 110, controller/processor 280 of UE 120, and/or any other component(s) of FIG. 1 may perform one or more techniques associated with UAC parameter updating, as described in more detail elsewhere herein. For example, controller/processor 240 of BS 110, controller/processor 280 of UE 120, and/or any other component(s) of FIG. 1 may perform or direct operations of various processes as described herein. Memories 242 and 282 may store data and program codes for BS 110 and UE 120, respectively. A scheduler 246 may schedule UEs for data transmission on the downlink and/or uplink.

As indicated above, FIG. 1 is provided merely as an example. Other examples may differ from what is described with regard to FIG. 1.

As noted above, various device types may be characterized as UEs. A number of these UE types are being allocated a new UE classification denoted as 'NR-Light'. Examples of UE types that fall under the NR-Light classification include wearable devices (e.g., smart watches, etc.), industrial sensors, video cameras (e.g., surveillance cameras, etc.), and so on. Generally, the UE types grouped under the NR-Light classification are associated with lower communicative capacity. For example, relative to 'normal' UEs (e.g., UEs not classified as NR-Light), NR-Light UEs may be limited in terms of maximum bandwidth (e.g., 5 MHz, 10 MHz, 20 MHz, etc.), maximum transmission power (e.g., 20 dBm, 14 dBm, etc.), number of receive antennas (e.g., 1 receive antenna, 2 receive antennas, etc.), and so on. Some NR-Light UEs may also be sensitive in terms of power consumption (e.g., requiring a long battery life, such as several years) and may be highly mobile. Moreover, in some designs, it is generally desirable for NR-Light UEs to co-exist with UEs implementing protocols such as enhanced mobile broadband (eMBB), ultra-reliable, low-latency communication (URLLC), LTE NB-IoT/MTC, and so on.

Figure 3:
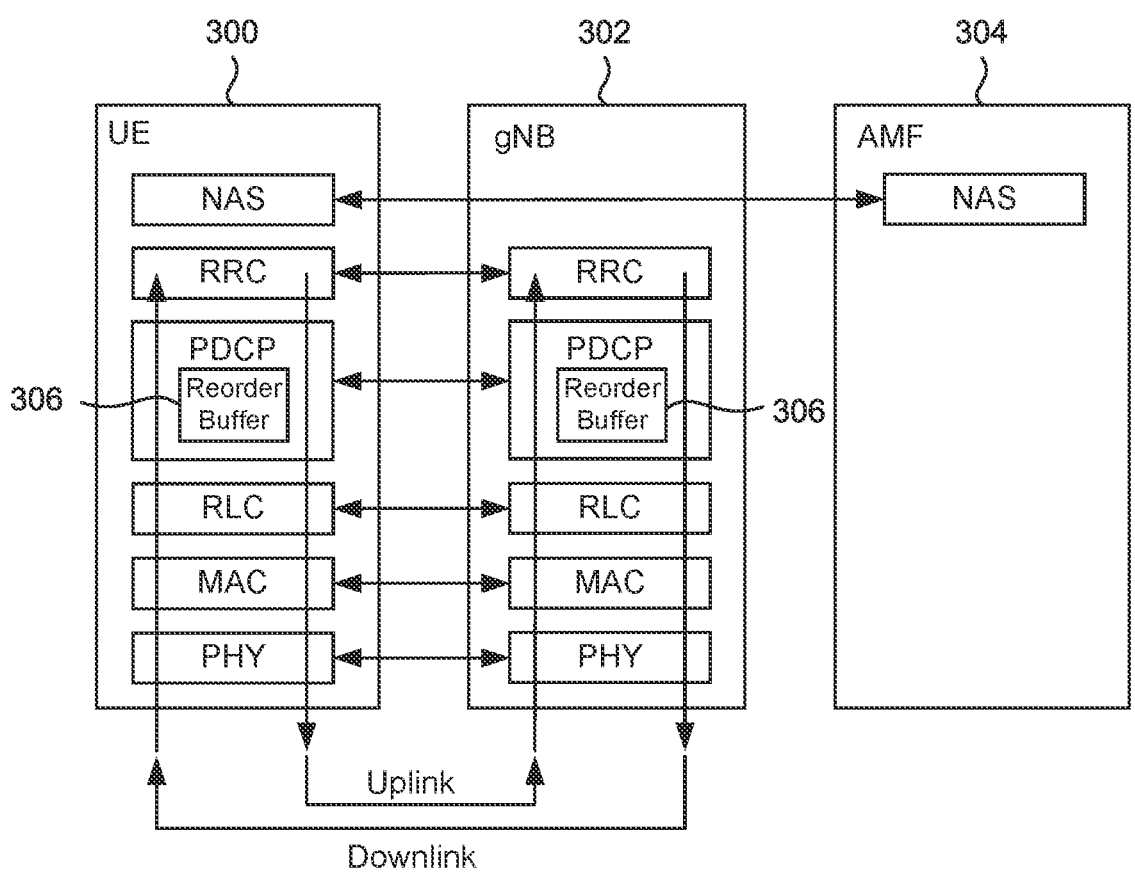
FIG. 3 is a diagram illustrating the 5G NR control plane protocol stack.

FIG. 3 shows the 5G NR control plane protocol stack as it exists within a UE 300, a NR base station 302, and a 5G core network (5GC) node 304. UE 300 may be any UE described herein, e.g., UE 120 in some aspects. BS 302 may be a 5G base station (gNB) or any other base station described herein, e.g., BS 110 in some aspects. Node 304 may be any core network node described herein, e.g., a core access and mobility management function (AMF) in some aspects. Layers common to both the UE 300 and the BS 302 include the radio resource control (RRC) layer, the packet data convergence protocol (PDCP) layer, the radio link control (RLC) layer, and the medium access control (MAC) layer. Downlink traffic is from the BS 302 to the UE 300, and uplink traffic is from the UE 300 to the BS 302.

The RRC layer is responsible for establishment, maintenance, and release of an RRC connection between the UE 300 and next generation (NG) radio access network (RAN), including: the establishment, configuration, maintenance, and release of signaling radio bearers (SRBs) and data radio bearers (DRBs); mobility functions including handover and context transfer; UE cell selection and reselection; and other functions.

The PDCP layer is responsible for sequence numbering of packets, reordering and duplicate detection of packets, ciphering and deciphering, retransmitting or discarding service data units (SDUs), duplicating protocol data units (PDUs), and other functions.

The RLC layer is responsible for sequence numbering of packets independent of the PDCP sequence numbering, segmentation and reassembly of SDUs.

The MAC layer is responsible for mapping between logical channels and transport channels, multiplexing/demultiplexing of MAC SDUs belonging to one or different logical channels into/from transport blocks (TB) delivered to/from the physical layer on transport channels, and other functions.

The functions of the non-access stratum (NAS) layer and the physical (PHY) layer are well known in the art and will not be described here.

A sending communications device may send an SRB message split across multiple SRB packets to a receiving communications device, and those messages may be received out of order. Thus, the PDCP layer on a receiving communications device, e.g., the UE 300 for downlink traffic and the BS 302 for uplink traffic, includes a reorder buffer 306 for reordering incoming packets, including SRB packets, that are received from a transmitting communications device (e.g., the BS 302 for downlink traffic and the UE 300 for uplink traffic). The PDCP layer receives these incoming packets from the RLC layer, stores them in the reorder buffer 306 as needed, and sends the reordered packets to the RRC layer for processing. For example, if the PDCP layer detects that an out-of-order (OOO) packet was received, the PDCP layer stores the OOO packet and waits for the missing packet(s) to arrive, at which time the PDCP layer reorders the packets into the correct order before releasing the packets to the RRC layer.

However, space in the reorder buffer 306 is limited, so a reordering timer (e.g., "$T_{reordering}$") is used to clear out old packets, i.e., by releasing the stored packets to the RRC layer. This timer value is configured by the network and is usually set to a short value because a short value is best for Data Radio Bearers (DRBs), which should have low latency, and because an uncorrected OOO DRB packet is usually not fatal and can be detected and corrected, e.g., using hybrid automatic repeat request (HARQ) feedback.

Conventional systems use the same reordering timer value for all packets entering the reorder buffer 306, regardless of packet type. Although a short value for a reordering timer is good for DRB messages, it is not good for SRB messages: if a corrupted or truncated SRB message is released to the RRC layer, the resulting SRB message may be discarded by the RRC layer, or perhaps worse, erroneously interpreted incorrectly by the RRC layer, with either action possibly resulting in severe consequences, such as radio link failure (RLF). For example, if an SRB message spans two packets, the second packet is received first and stored by the PDCP, and the first packet is not received until after the reordering timer had expired, then the second packet is released to the RRC layer and the first packet is discarded because it arrived outside of the reordering window. The SRB instructions in the first packet will never be received by the RRC, and the contents of the second packet may be erroneously interpreted to be a different SRB instruction than what was intended by the network.

To give a more specific example: if a first RRC packet is a security mode command (SMC) with valid MAC I is missed or its sequence number (SN) order is corrupted, then after the reorder expiry, the second RRC packet with a valid MAC I is treated as a SMC due to its first arrival as a non-zero MAC I packet. This will cause the PDCP to await a security configuration from the RRC layer while holding the other packets in a security pending queue. Since RX_DELIV has moved, the actual SMC will never be received; since the assumed packet is not SMC, the pending queue will stall.

Moreover, a conventional UE does not unilaterally generate a request to retransmit what it detects to be a missing packet; instead, the UE waits for polling from the network, which may not occur in time for the UE to notify the gNB of the missing packet and receive the missing packet from the gNB before the reordering timer expires.

Thus, conventional methods for handling unordered N SRB packets in the event of reorder expiry at a communications device may cause severe consequences, such as causing a pending queue to stall, or even RLF. To address the technical problems of conventional methods of handling unordered NR SRB packets in the event of reorder expiry at the communications device described above, several technical solutions are herein presented.

One approach is to treat SRB messages differently from DRB messages, i.e., by provisioning a different expiration timer for SRB messages—one that has a longer duration than the timer used for DRB messages—which would give the communications device additional time to notify the sending communications device of a missing SRB packet and receive the missing SRB packet from the sending communications device before the longer SRB reordering timer expires. This also allows DRB messages to still use a short expiration timer as in conventional systems, with all of the benefits that a short DRB expiration timer provides, such as low latency. Having separate timers also provides the network with the flexibility to tune each expiration period as best suited for each type of message, independently of each other.

Another approach is for the communications device to provide a fast NACK for packets that have been received out-of-order (OOO), which can be detected based on the values of the Sequence Numbers assigned to those packets by the transmitting side. This allows the communications device to request retransmission by the sending communications device immediately rather than waiting for the sending communications device to check on receive status. This gives the sending communications device time to provide the missing packet before the reordering timer expires.

Yet another approach is to combine the two approaches above. Any of the approaches described herein may be performed at a UE, at a base station, or at both. These approaches provide the technical advantage of avoiding the potentially severe consequences that can occur if a multi-packet SRB message is received out-of-order or the missing earlier packets are not received before the expiry of a reordering timer. Such consequences include, but are not limited to, causing a pending queue to stall, and failure of a radio link.

Figure 4:
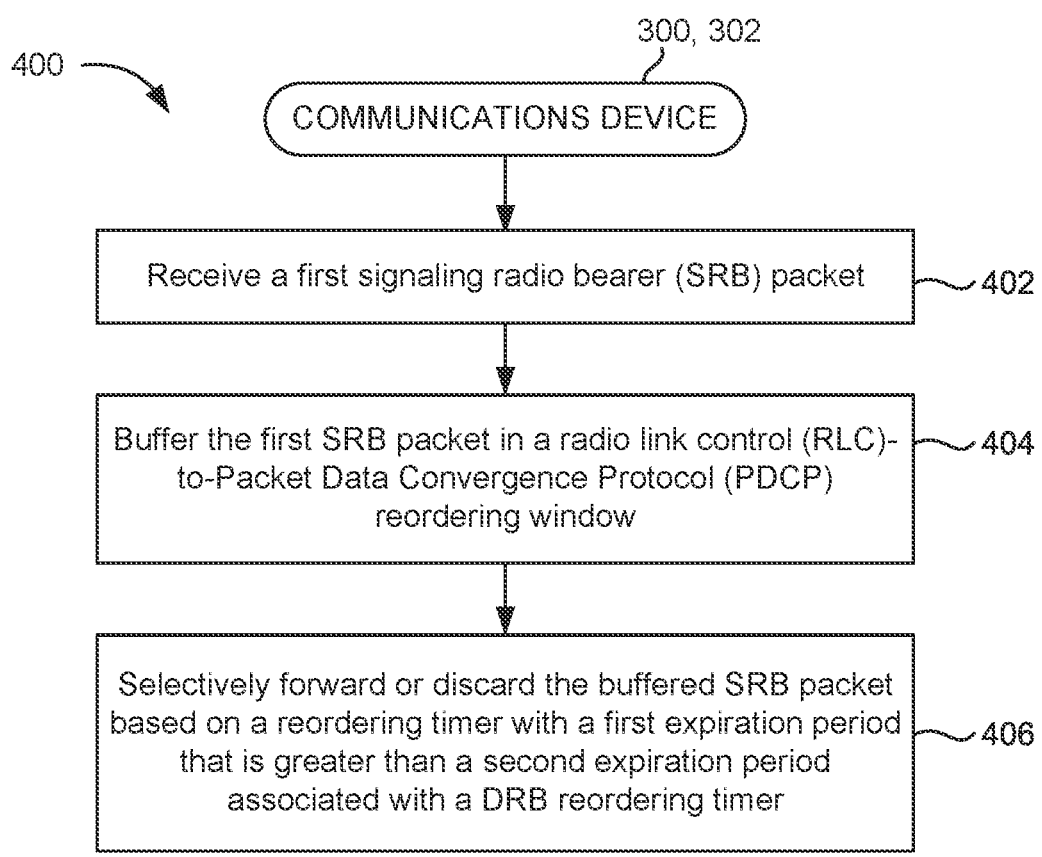
FIGS. 4 and 5 are flow charts illustrating exemplary methods of wireless communication according to some aspects.

FIG. 4 is a flow chart illustrating an exemplary method 400 of wireless communication according to some aspects. The method 400 of FIG. 4 may be performed at a communications device that receives SRB packets from another communications device. In some aspects, the method 400 of FIG. 4 is performed at a base station such as BS 302, with SRB packets being received from a UE such as UE 300. In other aspects, the method 400 of FIG. 4 is performed at a UE such as UE 300, with SRB packets being received from a 300 base station such as BS 302. FIG. 4 illustrates one approach to handling unordered NR SRB packets in the event of reordering timer expiry at the communications device—namely, to provision a different expiration timer for SRB messages (e.g., one that has a longer duration than the timer used for DRB messages) in order that the system has a chance to identify missing SRB packets and request retransmission of the missing SRB packet or otherwise compensate for the missing SRB packet before the SRB timer expires. Maintaining a shorter duration DRB reordering timer allows DRB packets to have low latency through the control plane protocol stack.

At 402, the communications device receives a first SRB packet. In some aspects, the communications device corresponds to a BS such as BS 300 and the first SRB packet is received from a UE such as UE 300. In some aspects, the communications device corresponds to a UE such as UE 300 and the first SRB packet is received from a BS such as BS 300.

At 404, the communications device buffers the first SRB packet in a RLC-to-PDCP reordering window. For example, a transmitting communications device (e.g., gNB or UE) may send an SRB message split across multiple SRB packets to the receiving communications device. Upon receipt of an SRB packet at the physical layer, the SRB packet is processed by the MAC layer and the RLC layer before arriving at the PDCP layer, where the SRB packet is placed into the reorder buffer and an SRB reordering timer is started for that packet.

At 406, the buffered SRB packet is selectively forwarded or discarded based upon a reordering timer with a first expiration period that is greater than a second expiration period associated with a data radio bearer (DRB) reordering timer, which allows the UE 120 additional time to notify the BS 110 of a missing SRB packet and receive the missing SRB packet from the BS 110 before the longer SRB reordering timer expires. In some aspects, an incoming packet arrives at the PDCP layer and is identified as an OOO SRB packet, which starts an SRB reordering timer. The OOO SRB packet is placed in a packet reordering buffer, such as reorder buffer 306 in FIG. 3. If the missing SRB packet is received before expiration of the SRB reordering timer, the SRB packets are reordered and released to the RRC layer. If the missing SRB packet is not received before expiration of the SRB reordering timer, the buffered OOO SRB packet is discarded.

In another example, after the first OOO SRB packet is received and buffered, another packet arrives at the PDCP layer and is identified as an OOO DRB packet, which starts a DRB reordering timer which has a shorter time period than the SRB reordering timer. The OOO DRB packet is also placed into the reordering buffer 306. If the missing DRB packet is received before expiration of the DRB reordering timer, the DRB packets are reordered and released to the RRC layer. If the missing DRB packet is not received before expiration of the DRB reordering timer, the buffered OOO DRB packet is discarded. Because the DRB reordering timer duration is shorter than the SRB reordering timer duration, however, this decision whether or not to discard the buffered OOO DRB packet will occur before the decision whether or not to discard the buffered OOO SRB packet, even though the OOO DRB packet was received after the OOO SRB packet. Likewise, a decision to discard the OOO DRB packet will not cause the OOO SRB packet to be discarded.

Figure 5:
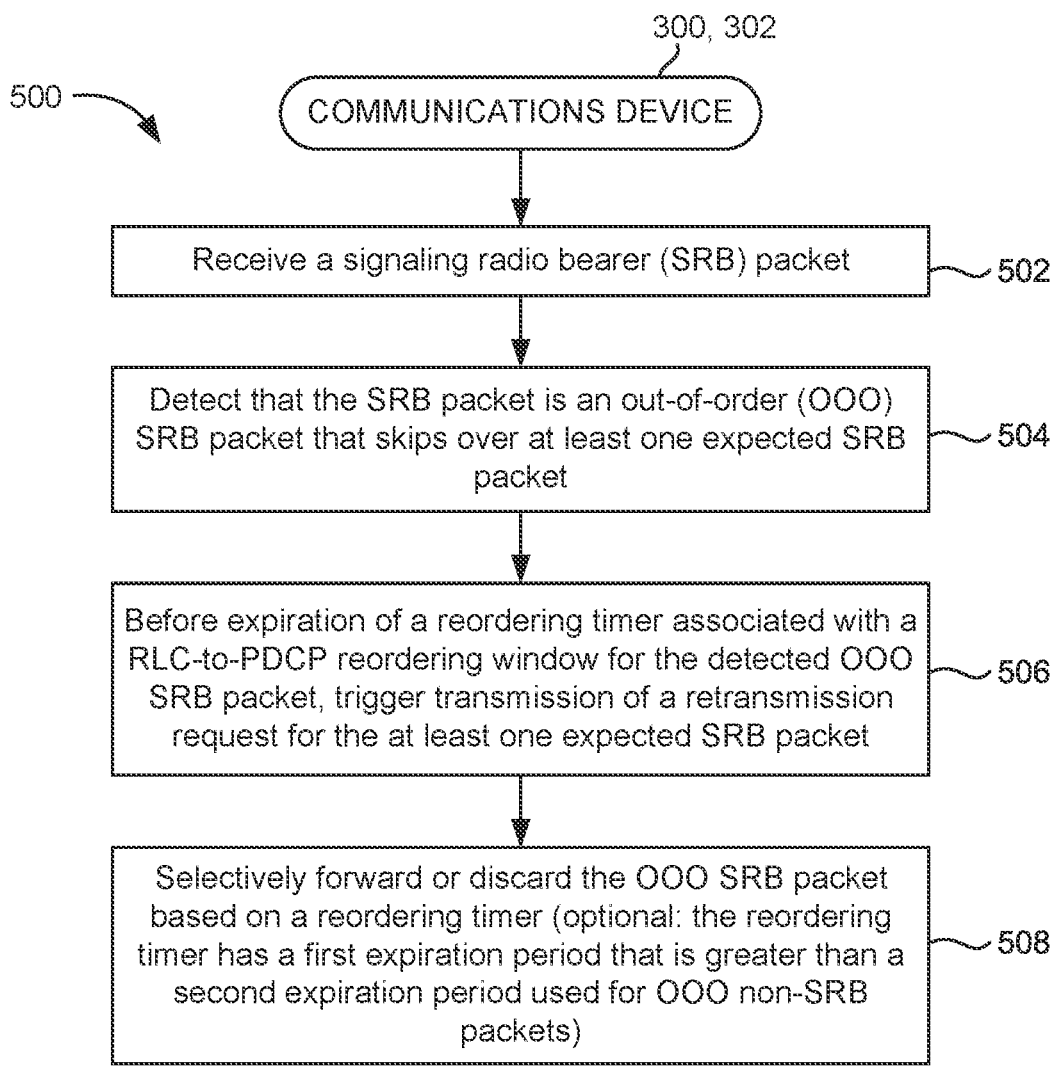

FIG. 5 is a flow chart illustrating an exemplary method 500 of wireless communication according to some aspects. The method 500 of FIG. 5 may be performed at a communications device that receives SRB packets from another communications device. In some aspects, the method 500 of FIG. 5 is performed at a base station such as BS 302, with SRB packets being received from a UE such as UE 300. In other aspects, the method 500 of FIG. 5 is performed at a UE such as UE 300, with SRB packets being received from a 300 base station such as BS 302. FIG. 5 illustrates another approach to handling unordered NR SRB packets in the event of reordering timer expiry at the communications device—namely, to provide a fast NACK for packets that have been received out-of-order (OOO), to give the network time to provide the missing packet before the reordering timer expires.

At 502, the communications device receives an SRB packet. In some aspects, the communications device corresponds to a BS such as BS 300 and the SRB packet is received from a UE such as UE 300. In other aspects, the communications device corresponds to a UE such as UE 300 and the SRB packet is received from a BS such as BS 300.

At 504, the communications device may detect that the SRB packet is an OOO SRB packet that skips over at least one expected SRB packet. In some aspects, the OOO SRB packet can be detected based on the values of the sequence numbers assigned to those packets by the transmitting side. In some aspects, a PDCP layer within the communications device control plane protocol stack may expect to receive a packet with a PDCP sequence number of X but instead receives a packet with a PDCP sequence number of Y (where Y>X).

At 506, in response to the detecting and before expiration of a reordering timer associated with RLC-to-PDCP reordering window for the detected out-of-order SRB packet, the communications device may trigger transmission of a retransmission request for the at least one expected (e.g., missing or not received yet) SRB packet. In some aspects, the PDCP layer within the communications device may prompt the communications device to send a hybrid automatic repeat request (HARQ) negative acknowledgement (NACK) for the at least one expected SRB packet. Using this method 500, there is a possibility that the one or more expected packets may be retransmitted by the sending communications device and received by the communications device before the expiration of the reordering timer associated with RLC-to-PDCP reordering window.

At 508, the communications device selectively forwards or discards the OOO SRB packet based upon a reordering timer with a first expiration period that is greater than a second expiration period associated with a data radio bearer (DRB) reordering timer. In some aspects, upon detection of an OOO SRB packet, the communications device places the OOO SRB packet into a reordering buffer and starts a reordering timer. In some aspects, the same reordering timer is used for both SRB and non-SRB OOO packets. In some aspects, one reordering timer is used for SRB packets and another reordering timer is used for non-SRB packets; the two reordering timers may have the same or different timer durations.

Figure 6:
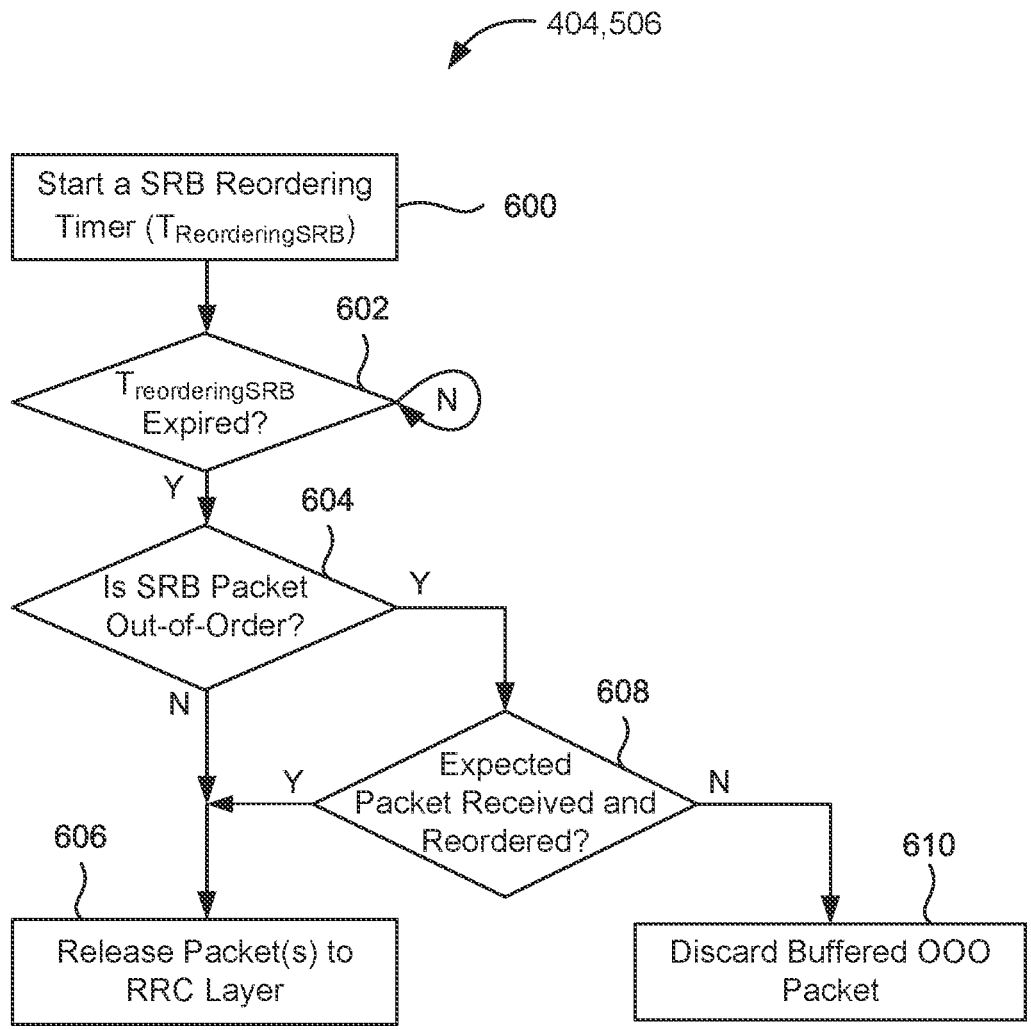
FIG. 6 is a flow chart illustrating in more detail a portion of an exemplary method of wireless communication according to some aspects.

FIG. 6 is a flow chart illustrating in more detail how a buffered SRB packet is selectively forwarded or discarded based upon a reordering timer with a first expiration period that is greater than a second expiration period associated with a DRB reordering timer, according to some aspects. Using a long expiration period for SRB packets would give the communications device additional time to notify the sending communications device of a missing SRB packet and receive the missing SRB packet from the sending communications device before the longer SRB reordering timer expires. This also allows DRB messages to still use a short expiration timer as in conventional systems, with all of the benefits that a short DRB expiration timer provides, such as low latency.

At 600, an SRB reordering timer ($T_{reorderingSRB}$) is started. In some aspects, this timer is maintained at an PDCP layer within the communications device. In some aspects, the expiration period of $T_{reorderingSRB}$ is based at least in part upon a third expiration period associated with a radio resource control (RRC) timer for a message corresponding to the SRB packet. In some aspects, the expiration period of $T_{reorderingSRB}$ is extended to a point in time when the SRB is dismantled.

At 602, the communications device determines whether $T_{reorderingSRB}$ has expired; if not, the method remains at 602 until $T_{reorderingSRB}$ expires. During this time, the communications device may be receiving and processing additional packets. If additional OOO packets are received, for example, those OOO packets are also placed into the reorder buffer. If a subsequent OOO packet is an SRB packet, another instance of $T_{reorderingSRB}$ may be established, or the same instance of $T_{reorderingSRB}$ may be used for it and all subsequent OOO packets as well. If a subsequent OOO packet is a non-SRB packet, such as a DRB packet, a different reordering timer, e.g., $T_{reorderingDRB}$, with a shorted duration than $T_{reorderingSRB}$, is started for the OOO DRB packet.

At 604, once $T_{reorderingSRB}$ has expired, the communications device determines whether the buffered SRB packet is an out-of-order (OOO) packet that skips over at least one expected SRB packet. If the buffered SRB packet is not an OOO packet, the process proceeds to 606, where the communications device releases the buffered SRB packet to the RRC layer. If the buffered SRB packet is an OOO packet, the process proceeds to 608.

At 608, the communications device determines whether the at least one expected SRB packet has been received and reordered. If so, the process continues to 606, and the reordered SRB packets are released to the RRC layer. If not, then at 610, the buffered SRB packet is discarded and not forwarded to the RRC layer. Doing so prevents a partial or malformed SRB packet from being processed by the higher layers, and thus avoids the potentially catastrophic effect that might result from misconfiguration of a signaling radio bearer.

In some aspects, the first expiration period is based is based at least in part upon a third expiration period associated with an RRC timer for a message corresponding to the buffered SRB packet. In some aspects, the first expiration period is associated with an existing DRB reordering timer. For example, the first expiration period may be proportional to (e.g., 2×, 3×, 120% of, etc.) an existing DRB reordering timer or may be proportional to an existing DRB timer plus an additional, fixed duration. In some aspects, the first expiration period may be extended up to the point where the SRB would be dismantled.

In some aspects, only OOO packets are placed into a reorder buffer, and non-OOO packets are forwarded immediately to the RRC layer. At the expiration of the reordering timer for an OOO packet, if the missing packet has since been received, the packets are reordered and released to the RRC layer in correct order; if the missing packet has not been received, the OOO packet is discarded and not forwarded to the RRC layer.

In some aspects, all packets are placed into a reorder buffer regardless of whether or not they are OOO packets; non-OOO packets are released to the RRC layer after the expiration of the reordering timer, and OOO packets are released to the RRC layer only if the missing packet has since been received and the OOO packets have been reordered successfully in the reorder buffer.

Figure 7:
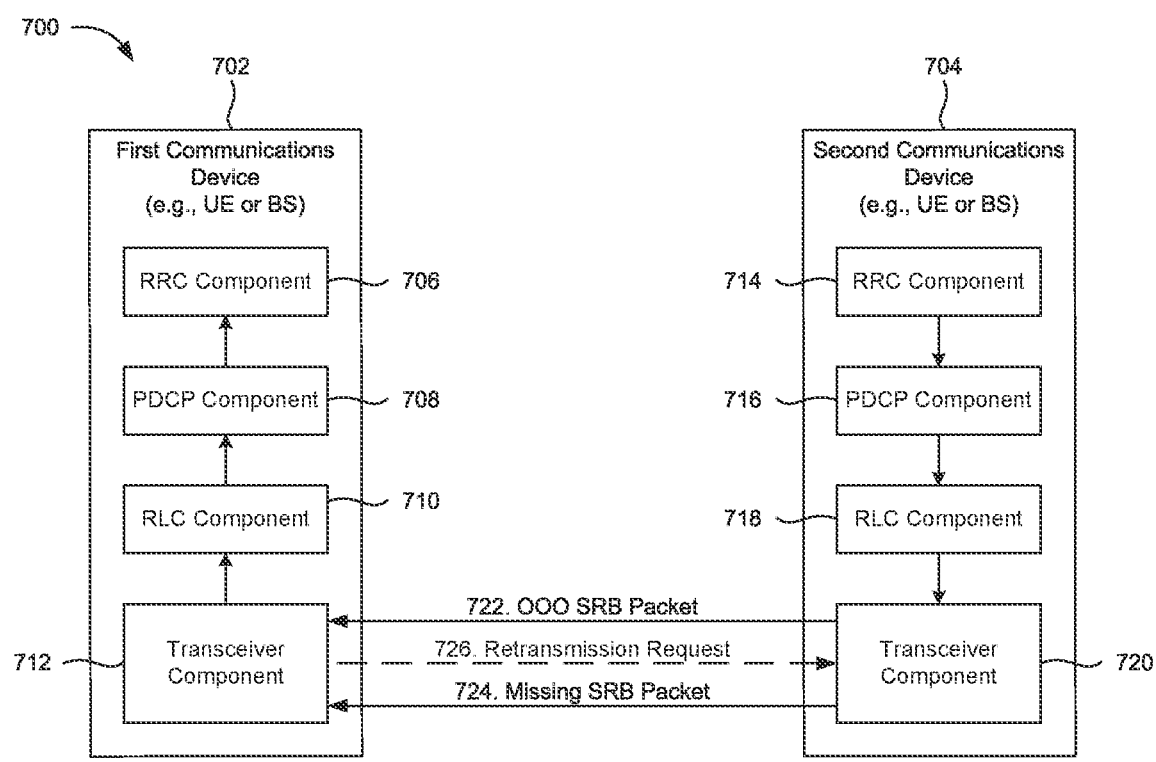
FIG. 7 is a conceptual data flow diagram illustrating the data flow between different means/components in exemplary apparatuses according to some aspects.

FIG. 7 is a conceptual data flow diagram 700 illustrating the data flow between different means/components in exemplary apparatuses a first communications device 702 (e.g., receiving device) and a second communications device 704 (e.g., transmitting device) in accordance with an aspect of the disclosure. In the aspect illustrated in FIG. 7, the first communications device 702 may be a UE (e.g., UE 120) in communication with the second communications device 704, which may be a base station (e.g., BS 110). In other aspects, the first communications device 702 may be a base station and the second communications device 704 may be a UE.

The apparatus 702 includes an RRC component 706, which may correspond to processor circuitry in UE 120 as depicted in FIG. 2, including controller/processor 280, etc. The apparatus 702 further includes a PDCP component 708, which may correspond to processor circuitry in UE 120 as depicted in FIG. 2, including controller/processor 280, etc. The apparatus 702 further includes an RLC component 710, which may correspond to processor circuitry in UE 120 as depicted in FIG. 2, including controller/processor 280, etc. The apparatus 702 further includes a transceiver component 712, which may correspond to circuitry in UE 120 as depicted in FIG. 2, including controller/processor 280, antenna(s) 252a . . . 252r, demodulators(s) 254a . . . 254r, MIMO detector 256, receive processor 258, transmit processor 264, TX MIMO processor 266, etc.

The apparatus 704 includes an RRC component 714, which may correspond to processor circuitry in BS 110 as depicted in FIG. 2, including controller/processor 240. The apparatus 704 further includes a PDCP component 716, which may correspond to processor circuitry in BS 110 as depicted in FIG. 2, including controller/processor 240. The apparatus 704 further includes an RLC component 718, which may correspond to processor circuitry in BS 110 as depicted in FIG. 2, including controller/processor 240. The apparatus 704 further includes a transceiver component 720, which may correspond to circuitry in BS 110 as depicted in FIG. 2, including e.g., controller/processor 240, antenna(s) 234a . . . 234r, modulators(s) 232a . . . 232r, Tx MIMO processor 230, transmit processor 220, receive processor 238, MIMO detector 236, communication unit 244, etc.

Referring to FIG. 7, the transceiver component 720 sends an out-of-order SRB packet 722 to the transceiver component 712, which forwards the OOO SRB packet to the RLC component 710. The RLC component 710 forwards the OOO SRB packet to the PDCP component 708.

According to one aspect, the PDCP component 708 buffers the SRB packet 722 in a RLC-to-PDCP reordering window, and selectively forwards or discards the buffered SRB packet 722 based upon a reordering timer (herein referred to as an SRB reordering timer) with a first expiration period that is greater than a second expiration period associated with a data radio bearer (DRB) reordering timer (herein referred to as a DRB reordering timer). For example, if the transceiver component 720 sends the missing SRB packet 724 before the expiry of the SRB reordering timer, then SRB packet 722 is released to the RRC component 706. Otherwise, SRB packet 722 is discarded.

According to another aspect, the PDCP component 708 detects that the buffered SRB packet 722 has been received out-of-order packet that skips over at least one expected SRB packet, and in response, triggers transmission of a retransmission request 726 for the at least one expected SRB packet, before expiration of a reordering timer associated with a radio link RLC-to-PDCP reordering window for the detected out-of-order SRB packet. In some aspects, the PDCP component 708 selectively forwards or discards the buffered SRB packet 722 based upon an SRB reordering timer with a first expiration period that is greater than a second expiration period associated with a DRB reordering timer as described above.

One or more components of the apparatus 702 may perform each of the blocks of the algorithm in the aforementioned flowcharts of FIGS. 4-6. As such, each block in the aforementioned flowcharts of FIGS. 4-6 may be performed by a component and the apparatus 702 and apparatus 704 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Although FIG. 7 illustrates an example where the UE requests retransmission of a missing SRB packet the same principles may be applied in the opposite direction, e.g., the base station 704 may receive an OOO SRB packet and request that the UE 702 retransmit the missing SRB packet, and the UE 702 may resend the missing SRB packet in response to that request.

Figure 8:
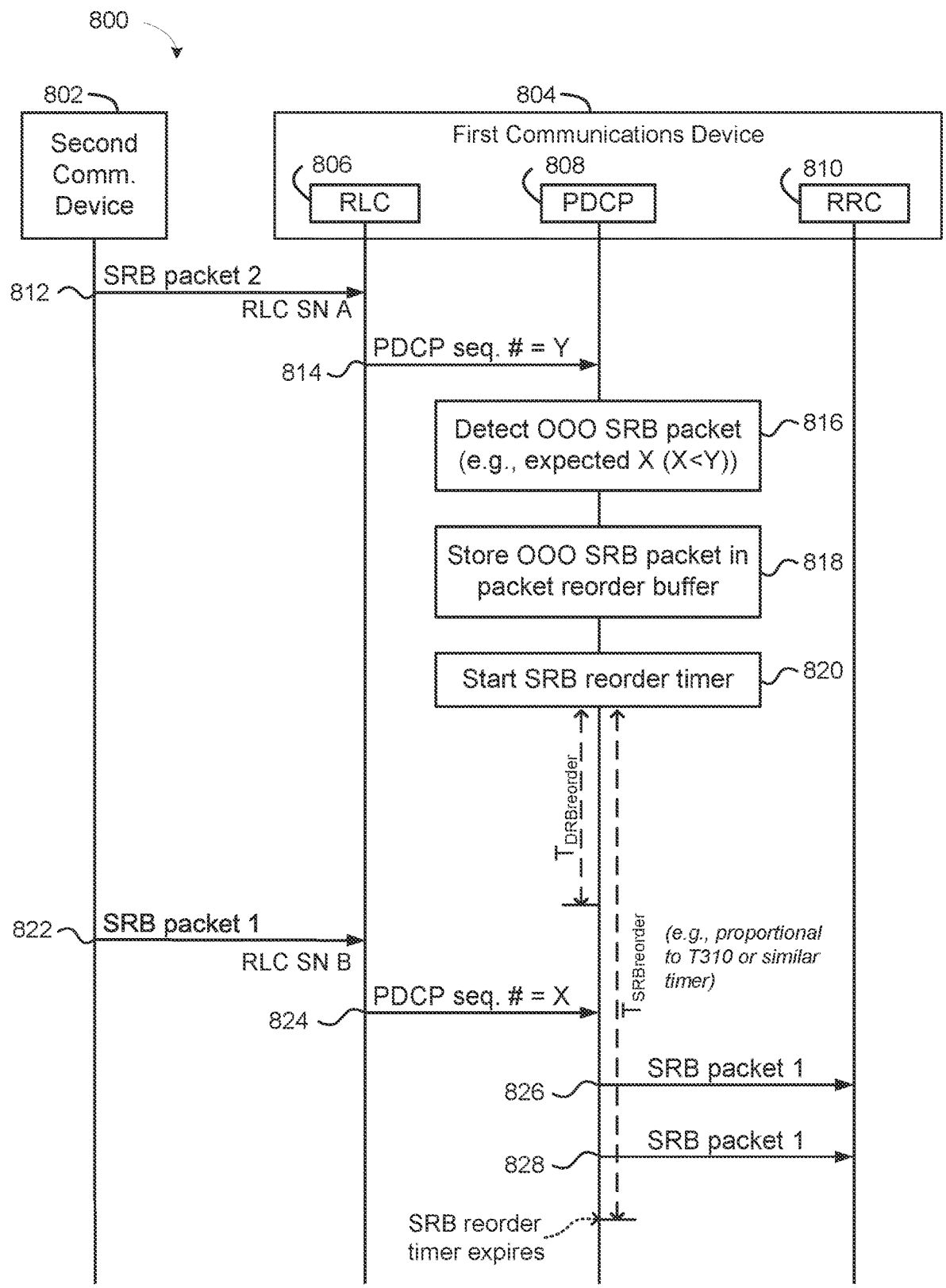
FIGS. 8 and 9 are signaling message diagrams illustrating exemplary methods of wireless communication according to some aspects.

FIG. 8 is signaling message flow diagram illustrating an exemplary method 800 of wireless communication according to some aspects. FIG. 8 illustrates signaling messages that may be exchanged between a second communications device 802 (e.g., transmitting device) and a first communications device 804 (e.g., receiving device) of SRB and DRB messages. In some aspects, the second communications device 802 may be a gNB and the first communications device 804 may be a UE. In some aspects, the second communications device 802 may be a UE and the first communications device 804 may be a gNB. In FIG. 8, the first communications device 804 includes an RLC layer 806 (e.g., 710, 718), a PDCP layer 808 (e.g., 708, 716), and an RRC layer 810 (e.g., 706, 714). For simplicity, the PHY and MAC layers are not shown.

At 812, the first communications device 804 receives the second half of an SRB message (labeled "SRB packet 2" in FIG. 8) from the second communications device 802. The SRB packet is received by the RLC layer 806 and assigned an RLC sequence number (SN)="A". At 814, the RLC layer 806 forwards the packet to the PDCP layer 808, which determines a PDCP sequence number="Y". The PDCP layer 808 is expecting the PDCP sequence number to be "X" (X<Y), and so, at 816, the PDCP layer 808 detects that the SRB packet is out of order (OOO). At 818, the OOO SRB packet is stored in the packet reorder buffer (e.g., 306). At 820, an SRB reordering timer is started.

In FIG. 8, the SRB reordering timer has a longer duration (labeled $T_{SRBreorder}$ in FIG. 8) than the duration of a non-SRB reordering timer, such as a DRB reordering timer (labeled $T_{DRBreorder}$ in FIG. 8). In some aspects, the SRB reordering timer may be proportional to timer T310 or similar. (In the example illustrated in FIG. 8, the DRB reordering timer would not be started since the received packet is an SRB packet, but the duration of the DRB reordering timer is shown in FIG. 8 for comparison only, i.e., to show that the reordering timer for SRB packets is longer than the reordering timer for non-SRB packets.)

At 822, the first communications device 804 receives the first half of the SRB message (labeled "SRB packet 1" in FIG. 8) from the second communications device 802. The SRB packet is received by the RLC layer 806 and assigned an RLC SN="B". In the example shown in FIG. 8, the DRB reordering timer would have expired before the first half of the SRB message was received. Since conventional systems use the DRB reordering timer for SRB packets as well, a conventional system would have discarded the OOO SRB packet or else would have forwarded the OOO SRB packet to the RRC layer by this time, which may cause severe problems. Since a separate, longer SRB reordering timer is used in the exemplary method illustrated in FIG. 8, the OOO SRB packet has not been discarded or forwarded yet.

At 824, the RLC layer 806 forwards the SRB packet to the PDCP layer 808, which determines that this packet is the missing packet. Since the SRB reordering timer has not yet expired, the OOO SRB packet and the newly-received SRB packet are reordered and forwarded to the RRC layer 810 in the correct order, e.g., at 826, SRB packet 1 is sent, and at 828, SRB packet 2 is sent.

Figure 9:
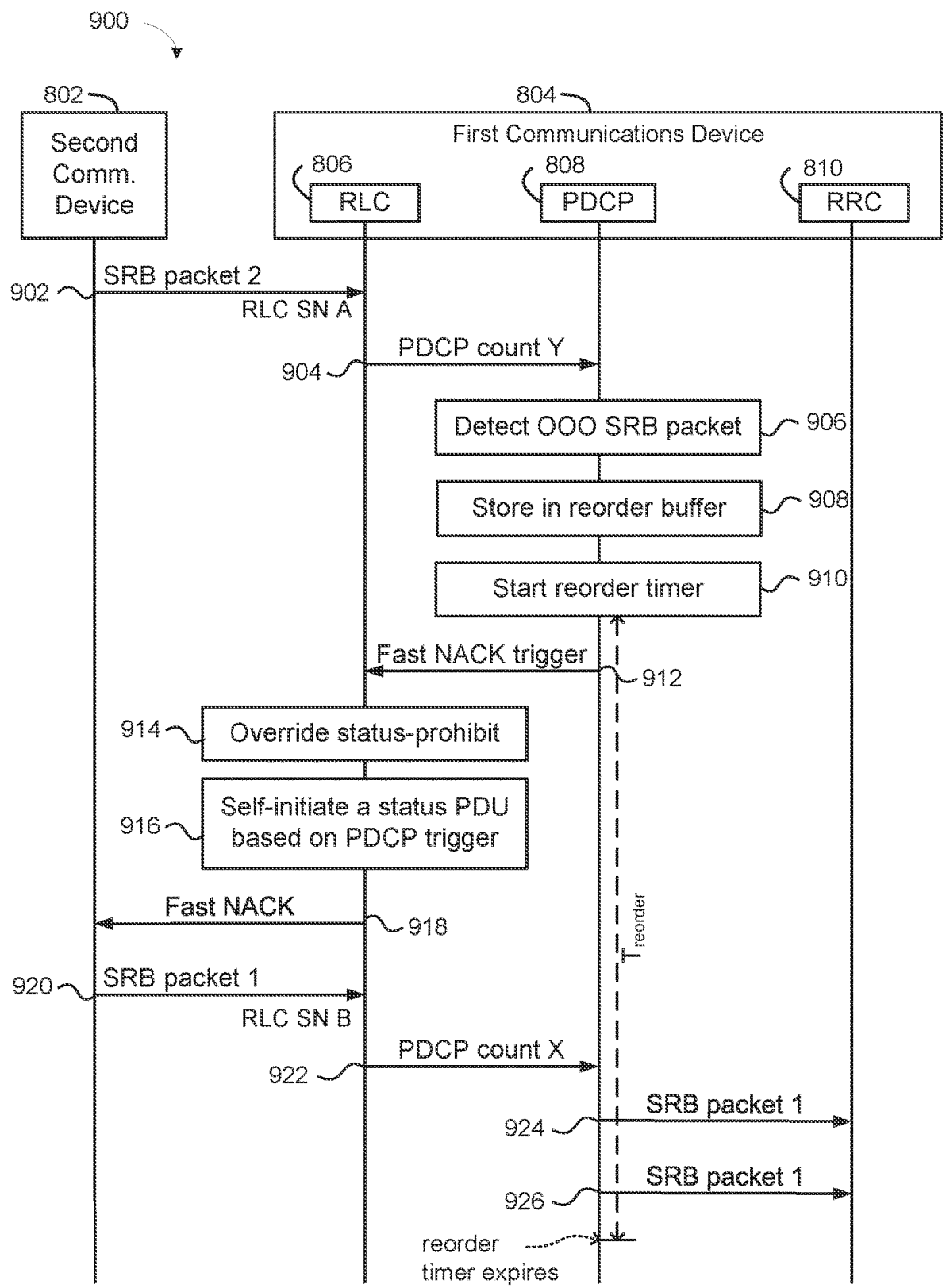

FIG. 9 is signaling message flow diagram illustrating an exemplary method 900 of wireless communication according to some aspects. FIG. 9 illustrates signaling messages that may be exchanged between the second communications device 802 and the first communications device 804 of SRB and DRB messages. In FIG. 9, the first communications device 804 includes an RLC layer 806, a PDCP layer 808, and an RRC layer 810. For simplicity, the PHY and MAC layers are not shown. Elements 802, 804, 806, 808, and 810 may be essentially identical to like-numbered elements in FIG. 8, and thus their descriptions will not be repeated here.

At 902, the first communications device 804 receives the second half of an SRB message (labeled "SRB packet 2" in FIG. 9) from the second communications device 802. The SRB packet is received by the RLC layer 806 and assigned an RLC SN="A". At 904, the RLC layer 806 forwards the packet to the PDCP layer 808, which determines a PDCP sequence number="Y". The PDCP layer 808 is expecting the PDCP sequence number to be "X" (X<Y), and so, at 906, the PDCP layer 808 detects that the SRB packet is out of order (OOO). At 908 the OOO SRB packet is stored in the packet reorder buffer (e.g., 306). At 910, a reordering timer is started. In some aspects, the reordering timer may be a conventional reordering timer (e.g., used for both SRB and non-SRB packets). In some aspects, the reordering timer may be an SRB-specific reordering timer.

At 912, the PDCP layer 808 sends a fast NACK trigger to the RLC layer 806. At 914, the RLC layer 806 performs override status-prohibit, and at 916, self-initiates a status PDU based on the PDCP fast NACK trigger. At 918, the first communications device 804 sends a fast NACK signal to the second communications device 802. In response to receiving the fast NACK signal, at 920 the second communications device 802 sends (or resends) the missing SRB packet ("labeled SRB packet 1" in FIG. 9) to the first communications device 804.

In the example shown in FIG. 9, the Fast NACK message was received by the second communications device 802 in time for the second communications device 802 to provide the missing packet to the first communications device 804 before the reordering timer expires. At 922, the RLC layer 806 forwards the SRB packet to the PDCP layer 808, which determines that this packet is the missing packet. Since the reordering timer has not yet expired, the OOO SRB packet and the newly-received SRB packet are reordered and forwarded to the RRC layer 810 in the correct order, e.g., at 924, SRB packet 1 is sent, and at 926, SRB packet 2 is sent, before the reordering timer has expired.

Figure 10:
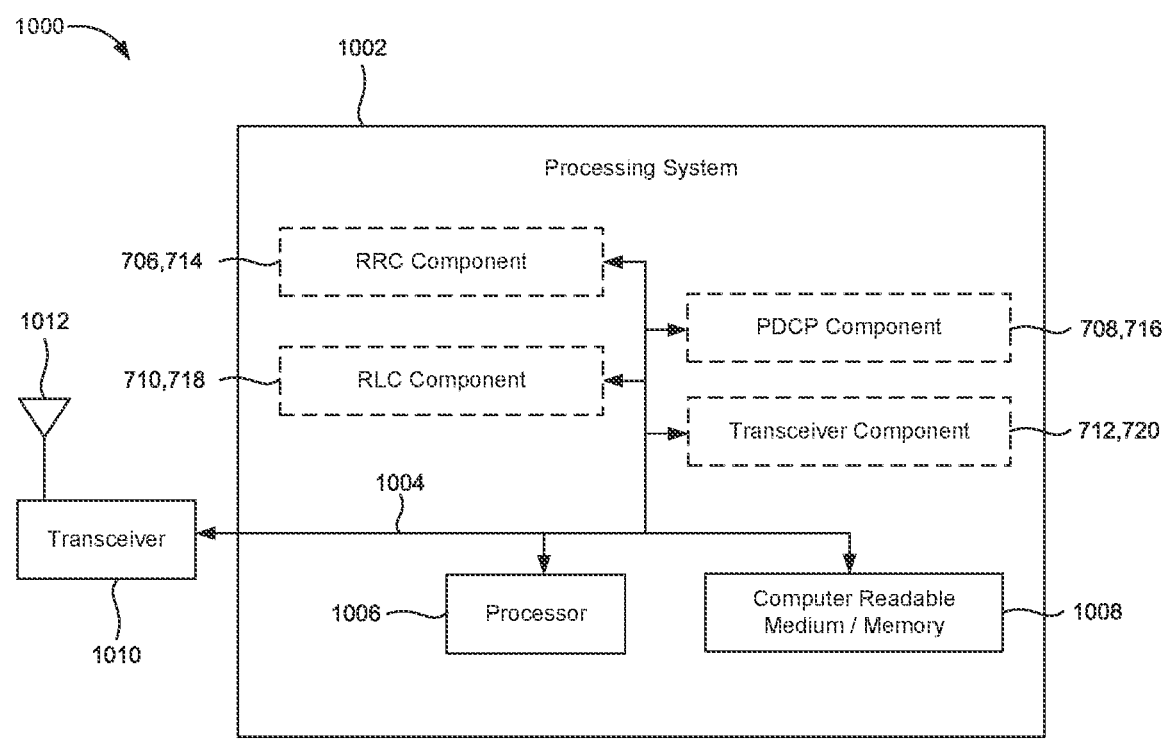
FIG. 10 is a diagram illustrating an example of a hardware implementation for an apparatus employing a processing system.

FIG. 10 is a diagram illustrating an example of a hardware implementation for an apparatus 1000 (e.g., a UE or a BS) employing a processing system 1002. The processing system 1002 may be implemented with a bus architecture, represented generally by the bus 1004. The bus 1004 may include any number of interconnecting buses and bridges depending on the specific application of the processing system 1002 and the overall design constraints. The bus 1004 links together various circuits including one or more processors and/or hardware components, represented by the processor 1006, the components 706, 708, 710, and 712, and the computer-readable medium/memory 1008. The bus 1004 may also link various other circuits such as timing sources, peripherals, voltage regulators, and power management circuits, which are well known in the art, and therefore, will not be described any further.

The processing system 1002 may be communicatively coupled to a transceiver 1010. The transceiver 1010 is communicatively coupled to one or more antennas 1012. The transceiver 1010 provides a means for communicating with various other apparatus over a transmission medium. The transceiver 1010 receives a signal from the one or more antennas 1012, extracts information from the received signal, and provides the extracted information to the processing system 1002, specifically the receiver portion of transceiver component 712. In addition, the transceiver 1010 receives information from the processing system 1002, specifically the transmitter portion of transceiver component 712, and based on the received information, generates a signal to be applied to the one or more antennas 1012. The processing system 1002 includes a processor 1006 communicatively coupled to a computer-readable medium/memory 1008. The processor 1006 is responsible for general processing, including the execution of software stored on the computer-readable medium/memory 1008. The software, when executed by the processor 1006, causes the processing system 1002 to perform the various functions described supra for any particular apparatus. The computer-readable medium/memory 1008 may also be used for storing data that is manipulated by the processor 1006 when executing software.

The processing system 1002 further includes at least one of the components 706/714, 708/716, 710/718, and 712/720. The components may be software components running in the processor 1006, resident or stored in the computer-readable medium/memory 1008, one or more hardware components communicatively coupled to the processor 1006, or some combination thereof. The processing system 1002 may be a component of the UE 120 of FIG. 1 and may include the memory 282, and/or at least one of the transmit processor 264, the receive processor 258, and the controller/processor 280. The processing system 1002 may be a component of the BS 110 of FIG. 1 and may include the memory 242, and/or at least one of the transmit processor 220, the receive processor 238, and the controller/processor 240.

In one configuration, the apparatus 1000 for wireless communication includes means for receiving a first SRB packet, means for buffering the first SRB packet in a RLC-to-PDCP reordering window, and means for selectively forwarding or discarding the buffered SRB packet based upon a reordering timer with a first expiration period that is greater than a second expiration period associated with a DRB reordering timer.

In another configuration, the apparatus 1000 for wireless communication includes means for receiving a first SRB packet, means for detecting that the first SRB packet is an OOO SRB packet that skips over at least one expected SRB packet, means for triggering, before expiration of a reordering timer associated with a RLC-to-PDCP reordering window for the first SRB packet, transmission of a retransmission request for the at least one expected SRB packet, and means for selectively forwarding or discarding the first SRB packet based upon the reordering timer.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of operating a communications device, the method comprising:
    receiving a first signaling radio bearer (SRB) packet;
    buffering the first SRB packet in a radio link control (RLC)-to-Packet Data Convergence Protocol (PDCP) reordering window; and
    selectively forwarding or discarding the first SRB packet based upon an SRB reordering timer with a first expiration period that is greater than a second expiration period associated with a data radio bearer (DRB) reordering timer, wherein the first expiration period is proportional to the DRB reordering timer or proportional to the DRB reordering timer plus an additional, fixed duration.

2. The method of claim 1, wherein selectively forwarding or discarding the first SRB packet based upon the SRB reordering timer comprises:
  determining that the SRB reordering timer with the first expiration period has expired;
  determining that the first SRB packet is an out-of-order (OOO) packet that skips over at least one expected SRB packet;
  determining that the at least one expected SRB packet has been received and that the first SRB packet and the at least one expected SRB packet have been reordered; and
  releasing the at least one expected SRB packet and the first SRB packet to a radio resource control (RRC) layer.

3. The method of claim 1, wherein selectively forwarding or discarding the first SRB packet based upon the SRB reordering timer comprises:
  determining that the SRB reordering timer with the first expiration period has expired;
  determining that the first SRB packet is an out-of-order packet that skips over at least one expected SRB packet;
  determining that the expected at least one SRB packet has not yet been received; and
  discarding the first SRB packet.

4. The method of claim 1, wherein the first expiration period is extended to a point in time when the SRB is dismantled.

5. The method of claim 1, wherein the communications device corresponds to a user equipment and the first SRB packet is received from a base station.

6. The method of claim 1, wherein the communications device corresponds to a base station and the first SRB packet is received from a user equipment.

7. A method of operating a communications device, the method comprising:
  receiving a first signaling radio bearer (SRB) packet;
  detecting that the first SRB packet is an out-of-order (OOO) SRB packet that skips over at least one expected SRB packet;
  triggering, before expiration of a reordering timer associated with a radio link control (RLC)-to-Packet Data Convergence Protocol (PDCP) reordering window for the first SRB packet, transmission of a retransmission request for the at least one expected SRB packet, wherein the reordering timer is an SRB reordering timer with a first expiration period that is greater than a second expiration period associated with a data radio bearer (DRB) reordering timer, wherein the first expiration period is proportional to the DRB reordering timer or proportional to the DRB reordering timer plus an additional, fixed duration; and
  selectively forwarding or discarding the first SRB packet based upon the reordering timer.

8. The method of claim 7, wherein the retransmission request comprises a NACK for the at least one expected SRB packet.

9. The method of claim 7, wherein selectively forwarding or discarding the first SRB packet based upon the reordering timer comprises:
  determining that the reordering timer has expired;
  determining that the first SRB packet is an out-of-order packet that skips over the least one expected SRB packet;
  determining that the at least one expected SRB packet has been received and that the first SRB packet and the at least one expected SRB packet have been reordered; and
  releasing the at least one expected SRB packet and the first SRB packet to a radio resource control (RRC) layer.

10. The method of claim 7, wherein selectively forwarding or discarding the first SRB packet based upon the reordering timer comprises:
  determining that the reordering timer has expired;
  determining that the first SRB packet is an out-of-order packet that skips over the at least one expected SRB packet;
  determining that the expected at least one SRB packet has not yet been received; and
  discarding the first SRB packet.

11. The method of claim 7, wherein the first expiration period is extended to a point in time where the SRB is dismantled.

12. The method of claim 7, wherein the communications device corresponds to a user equipment and the first SRB packet is received from a base station.

13. The method of claim 7, wherein the communications device corresponds to a base station and the first SRB packet is received from a user equipment.

14. A communications device, comprising:
  a memory;
  at least one transceiver; and
  at least one processor communicatively coupled to the memory and the at least one transceiver, the at least one processor configured to:
    receive a first signaling radio bearer (SRB) packet;
    buffer the first SRB packet in a radio link control (RLC)-to-Packet Data Convergence Protocol (PDCP) reordering window; and
    selectively forward or discard the first SRB packet based upon an SRB reordering timer with a first expiration period that is greater than a second expiration period associated with a data radio bearer (DRB) reordering timer, wherein the first expiration period is proportional to the DRB reordering timer or proportional to the DRB reordering timer plus an additional, fixed duration.

15. The communications device of claim 14, wherein selectively forwarding or discarding the first SRB packet based upon the SRB reordering timer comprises:
  determining that the SRB reordering timer with the first expiration period has expired;
  determining that the first SRB packet is an out-of-order packet that skips over at least one expected SRB packet;
  determining that the at least one expected SRB packet has been received and that the first SRB packet and the at least one expected SRB packet have been reordered; and
  releasing the at least one expected SRB packet and the first SRB packet to a radio resource control (RRC) layer of the communications device.

16. The communications device of claim 14, wherein selectively forwarding or discarding the first SRB packet based upon the SRB reordering timer comprises:
  determining that SRB the reordering timer with the first expiration period has expired;
  determining that the first SRB packet is an out-of-order packet that skips over at least one expected SRB packet;

determining that the expected at least one SRB packet has not yet been received; and discarding the first SRB packet.

17. The communications device of claim 14, wherein the first expiration period is extended to a point in time when the SRB is dismantled.

18. The communications device of claim 14, wherein the communications device corresponds to a user equipment and the SRB packet is received from a base station.

19. The communications device of claim 14, wherein the communications device corresponds to a base station and the SRB packet is received from a user equipment.

20. A communications device, comprising:
a memory;
at least one transceiver; and
at least one processor communicatively coupled to the memory and the at least one transceiver, the at least one processor configured to:
receive a first signaling radio bearer (SRB) packet;
detect that the first SRB packet is an out-of-order (OOO) SRB packet that skips over at least one expected SRB packet;
trigger, before expiration of a reordering timer associated with a radio link control (RLC)-to-Packet Data Convergence Protocol (PDCP) reordering window for the first SRB packet, transmission of a retransmission request for the at least one expected SRB packet, wherein the reordering timer is an SRB reordering timer with a first expiration period that is greater than a second expiration period associated with a data radio bearer (DRB) reordering timer, wherein the first expiration period is proportional to the DRB reordering timer or proportional to the DRB reordering timer plus an additional, fixed duration; and
selectively forward or discard the first SRB packet based upon the reordering timer.

21. The communications device of claim 20, wherein the retransmission request comprises a NACK for the at least one expected SRB packet.

22. The communications device of claim 20, wherein selectively forwarding or discarding the first SRB packet based upon the reordering timer comprises:
determining that the reordering timer has expired;
determining that the first SRB packet is an out-of-order packet that skips over the at least one expected SRB packet;
determining that the at least one expected SRB packet has been received and that the SRB packet and the at least one expected SRB packet have been reordered; and
releasing the at least one expected SRB packet and the first SRB packet to a radio resource control (RRC) layer of the communications device.

23. The communications device of claim 20, wherein selectively forwarding or discarding the first SRB packet based upon the reordering timer comprises:
determining that the reordering timer has expired;
determining that the first SRB packet is an out-of-order packet that skips over the at least one expected SRB packet;
determining that the expected at least one SRB packet has not yet been received; and
discarding the first SRB packet.

* * * * *